US008797284B2

(12) United States Patent
Bowler, II

(10) Patent No.: US 8,797,284 B2
(45) Date of Patent: Aug. 5, 2014

(54) USER INTERFACE AND METHOD FOR LOCATING AN INTERACTIVE ELEMENT ASSOCIATED WITH A TOUCH SENSITIVE INTERFACE

(75) Inventor: Roland K. Bowler, II, Kildeer, IL (US)

(73) Assignee: Motorola Mobility LLC, Libertyville, IL (US)

( * ) Notice: Subject to any disclaimer, the term of this patent is extended or adjusted under 35 U.S.C. 154(b) by 184 days.

(21) Appl. No.: 12/985,262

(22) Filed: Jan. 5, 2011

(65) Prior Publication Data

US 2012/0169620 A1 Jul. 5, 2012

(51) Int. Cl.
*G06F 3/041* (2006.01)
(52) U.S. Cl.
USPC ........................................................ 345/173
(58) Field of Classification Search
USPC ................................................ 345/173–179
See application file for complete search history.

(56) References Cited

U.S. PATENT DOCUMENTS

| 7,952,566 | B2 * | 5/2011 | Poupyrev et al. | 345/173 |
| 8,144,897 | B2 * | 3/2012 | Ranta | 381/107 |
| 2003/0098803 | A1 * | 5/2003 | Gourgey et al. | 341/21 |
| 2005/0219228 | A1 * | 10/2005 | Alameh et al. | 345/173 |
| 2006/0099996 | A1 * | 5/2006 | Kanai | 455/566 |
| 2007/0236474 | A1 * | 10/2007 | Ramstein | 345/173 |
| 2009/0116666 | A1 * | 5/2009 | Ranta | 381/107 |
| 2009/0219252 | A1 * | 9/2009 | Jarventie et al. | 345/173 |
| 2009/0322497 | A1 * | 12/2009 | Ku et al. | 340/407.2 |
| 2009/0322695 | A1 * | 12/2009 | Cho et al. | 345/173 |
| 2010/0055651 | A1 * | 3/2010 | Rantala et al. | 434/114 |
| 2010/0166223 | A9 * | 7/2010 | Ranta | 381/107 |
| 2010/0167800 | A1 * | 7/2010 | Wakizaka et al. | 455/575.1 |
| 2010/0328053 | A1 * | 12/2010 | Yeh et al. | 340/407.2 |
| 2011/0050576 | A1 * | 3/2011 | Forutanpour et al. | 345/168 |
| 2011/0141066 | A1 * | 6/2011 | Shimotani et al. | 345/177 |
| 2011/0248916 | A1 * | 10/2011 | Griffin et al. | 345/157 |

FOREIGN PATENT DOCUMENTS

WO 2010009552 A1 1/2010

\* cited by examiner

*Primary Examiner* — Amare Mengistu
*Assistant Examiner* — Sarvesh J Nadkarni
(74) *Attorney, Agent, or Firm* — Shumaker & Sieffert, P.A.

(57) ABSTRACT

A user interface for an electronic device and method for locating an interactive element having a position along an interactive surface of a touch sensitive interface of an electronic device are provided. The user interface has a touch sensitive interface, which includes one or more interactive elements having a position along an interactive surface, and a surface sensor, the surface sensor being adapted for receiving from a user a pattern of interaction with the touch sensitive interface at a location along the interactive surface. The user interface further includes an alert device and a controller. The controller includes a user interaction detection module, which is adapted for detecting the location of the pattern of interaction and comparing the location to the position of the one or more interactive elements. The controller further includes a feedback module, which is adapted for actuating the alert device for producing a user perceivable alert signal having a level of alert which is a function of the distance between the location of the pattern of interaction and the position of a closest one of the one or more interactive elements, wherein as the distance between the location of the pattern of interaction and the position of the closest one of the one or more interactive elements changes, the level of the alert changes.

19 Claims, 7 Drawing Sheets

USER INTERFACE AND METHOD FOR LOCATING AN INTERACTIVE ELEMENT ASSOCIATED WITH A TOUCH SENSITIVE INTERFACE

FIELD OF THE DISCLOSURE

The present disclosure relates generally to a user interface including a touch sensitive interface and, more particularly, to a user interface adapted for assisting the user in locating an interactive element along an interactive surface of a touch sensitive interface.

BACKGROUND

The use of touch sensitive interfaces, including those incorporated as part of a touch sensitive display have gained in popularity for their ease of use associated with a more intuitive interaction in accessing and controlling the functionality of electronic devices. When the touch sensitive interface is used in conjunction with a display screen, visual prompts and/or display elements can be presented via the display, which underlies portions of the touch sensitive interface that enable a user to directly interact with information and/or objects being displayed.

Alternatively, other forms of user interface types for use with displays, which have not incorporated a touch sensitive surface that coincides with the display surface, use indirect means for interacting with the displayed information and/or objects. Examples of indirect means for interacting with displayed information include the use of a keyboard or a mouse. In these instances, the user is interacting with the device and controlling its functionality through an interface that is spatially displaced from the display, which is where most results of the interaction are observable or made available to the user.

Because visual feedback can be so important in such instances, where the form of input is spatially displaced from the display on which information is conveyed to the user, in at least some environments, the efficient user of a piece of equipment will learn to interact with the various forms of input without looking at the instrumentality of the input, in order that they can instead remain focused on the information being presented to the user via the display. For example, typists interacting with an electronic device will learn to enter information (i.e., type) without looking at the keyboard.

While the combination of a display and touch sensitive surface has been described as a more direct form of interaction, even where an intermediary element, such as a stylus is used, the stylus feels like an extension of the user's fingers, such that the user feels like they are directly interacting with the displayed information and/or objects, similar to if the user were directly touching the touch sensitive surface of the display. However much of the familiarity and ease of interaction that comes with interacting with an integrated display and touch sensitive surface stems from the ability to see the elements being displayed with which the user can interact. There may be instances in which a user may need to interact with the device, e.g., for purposes of initiating a function, but may have limited ability to visually observe the device as at least a portion of their attention including their visual focus may be occupied elsewhere. Still further, there may be situations where a user is able to touch the device, but there may be an obstruction that cannot be avoided, which limits their ability to directly observe the device. Such an obstruction may be physical in nature, and may correspond to an item being carried by the user. Alternatively, lighting conditions may effectively obstruct the user's ability to clearly view the device, and/or may limit the user's ability to accurately identify or distinguish with specificity the information being presented.

In instances where the user is precluded from looking at the display, the use of a touch sensitive surface can sometimes be difficult or disadvantageous. In some instances, it can be difficult to confirm the particular location of an expected interactive object, and it may also be difficult to confirm that the proper or intended interface or element for a desired function is currently being displayed or is being interacted with by the user.

The present inventors have recognized that it would be beneficial to develop an apparatus and/or approach, which would enable user perceivable cues, which may not need a direct visual viewing of the interaction in order to assist the user in locating one or more interactive elements positioned on or along a touch sensitive surface.

SUMMARY

The present disclosure provides among other features a user interface for an electronic device or other machine. The user interface has a touch sensitive interface, which includes one or more interactive elements having a location or position on or along an interactive surface, and a sensor, the sensor being adapted for receiving from a user a pattern of interaction with the touch sensitive interface at a location along the interactive surface. The user interface further includes an alert device and a controller. The controller includes a user interaction detection module, which is adapted to detect the location of the pattern of interaction and to compare the location to the position of the one or more interactive elements. The controller further includes a feedback module, which is adapted to actuate the alert device to produce a user perceivable alert signal having a level of alert that is a function of a distance between the location of the pattern of interaction and the position of a closest one of the one or more interactive elements, wherein as the distance between the location of the pattern of interaction and the position of the closest one of the one or more interactive elements changes, the level of the alert changes.

In at least one embodiment, the one or more interactive elements include an image of a virtual key visually represented along the interactive surface via a touch sensitive display.

In at least a further embodiment, the one or more interactive elements includes a speaker. In at least some of these instances, the pattern of interaction includes a shape of at least a portion of an ear of the user placed adjacent to the touch sensitive interface.

In at least a still further embodiment, the controller additionally includes a learning module, which is adapted for detecting the pattern of interaction with the touch sensitive interface received from the user, when the user indicates that the location of the pattern of interaction coincides with a position of a corresponding one of the one or more interactive elements.

The present disclosure further provides a method of locating an interactive element positioned on or along an interactive surface of a touch sensitive interface of an electronic device or other machine. The method includes detecting a location of user interaction with the touch sensitive interface relative to the position of the interactive element. Providing a user perceptible alert having a characteristic that is a function of distance between the location of the user interaction and the position of the interactive element, wherein the characteristic of the alert changes with changes in the distance between the location of user interaction and the position of the interactive element.

These and other objects, features, and advantages of this disclosure are evident from the following description of one or more preferred embodiments of this invention, with reference to the accompanying drawings.

DETAILED DESCRIPTION

Figure 1:
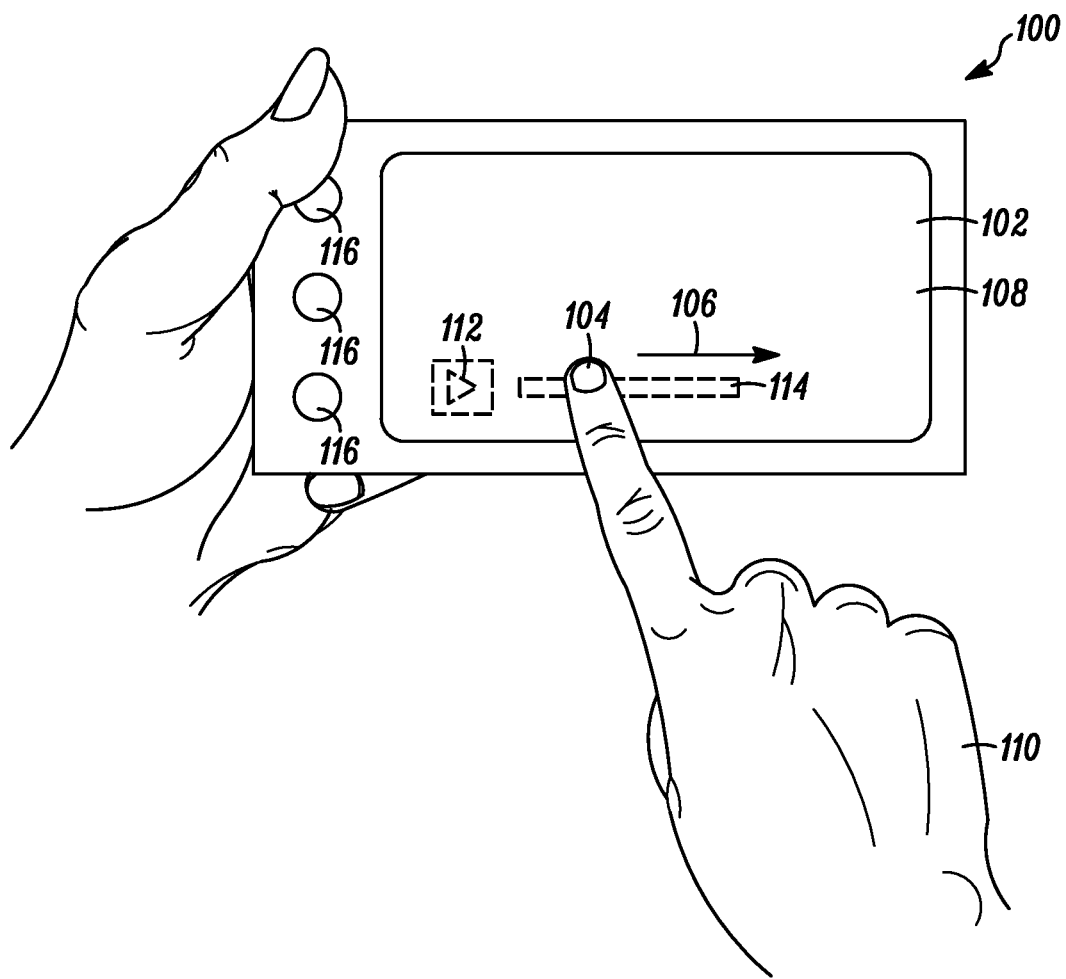
FIG. 1 is a plan view of an exemplary electronic device incorporating a touch sensitive interface, such as a touch sensitive display, for receiving a user interaction relative to one or more interactive elements while being operated in landscape mode.

While the present disclosure is susceptible of embodiments in various forms, there is shown in the drawings and will hereinafter be described presently preferred embodiments with the understanding that the present disclosure is to be considered an exemplification of the invention and is not intended to limit the invention to the specific embodiments illustrated. Furthermore, while the various figures are intended to illustrate the various aspects of the present invention, in doing so, the elements are not necessarily intended to be drawn to scale. In other words, the size, shape and dimensions of some layers, features, components and/or regions for purposes of clarity or for purposes of better describing or illustrating the concepts intended to be conveyed may be exaggerated and/or emphasized relative to other illustrated elements.

FIG. 1 illustrates a plan view of an exemplary electronic device 100 incorporating a touch sensitive interface 102. In the particular embodiment illustrated, the touch sensitive interface 102 is incorporated as part of a touch sensitive display 108, where a surface coincides with and extends to include a display, which provides information visually to the user 110. The surface is adapted to receive an input from a pointer, such as a user's finger 104 or other appendage, or a stylus (not shown), where the nature of the interaction of the pointer with the sensor surface defines a pattern of interaction and any related gesture 106 or movement. For example, the pattern of interaction may include touching or contacting a point on the touch sensitive interface with the pointer, or navigation or other movement of the pointer along or across the touch sensitive interface while contacting the interface, among other interactions between the pointer and the touch sensitive interface, or the impression of an outline form, e.g., of a user's ear, palm or other body part, on the interactive surface and the movement of that form about the surface, as described further below. The electronic device could be one of many different types of electronic devices including wireless communication devices, such as radio frequency (i.e., cellular) telephones, media (i.e., music, video) players, personal digital assistants, portable video gaming devices, cameras, and/or remote controls. The electronic device may also be a user input subassembly of some other equipment, like an appliance or other machine.

In the illustrated embodiment, the touch sensitive display 108 is presenting to the user via the display a pair of interactive elements 112 and 114, associated with the playback of a media file, such as an audio, video and/or a multi-media file. The pair of interactive elements correspond to a virtual button or key 112 and a slider bar 114. The virtual button 112, in at least some instances, might toggle between play and stop, or play and pause. More generally, the virtual button and other keys may perform any function, which is generally dependent on the characteristic of the host device with which the touch sensitive interface or display is integrated. Alternatively, the slider bar 114 might be used to control the volume of an audio portion of a media file, or it might be used to mark a current playback position within the overall durational span of the file. In some embodiments, a slider, not illustrated, would generally mark a current set position at one of a plurality of potential positions along the slider bar 114. In the particular embodiment illustrated, the slider is present, but is obstructed from view, underneath the user's finger 104 that is currently functioning as a pointer. Upon selection of the slider, an associated gesture 106 or movement of the pattern of interaction along the length of the slider bar will adjust the current position of the slider along the slide bar in the direction of the gesture. In the illustrated embodiment, the pattern of interaction corresponds to the size and shape of the portion of the finger that presses against the sensor surface as the finger interacts with the touch sensitive interface 102.

Even if one were to become specifically familiar with the interactive elements associated with the above described playback function, without looking at the display one still might have difficulties readily locating the currently enabled interactive elements, as at least one of the elements, namely the slider, could be at any one of a plurality of locations along the length of the slider bar 114.

In addition to the exemplary virtual button 112, the exemplary electronic device additionally includes one or more permanently positioned physical buttons 116, which are located to the side of the touch sensitive display 108. In some instances, the touch sensitive interface can extend beyond the boundaries of the display. For example, the touch sensitive interface could include the side regions adjacent the display including the areas in which the physical buttons 116 are located. In such an instance, the detected user interaction with the touch sensitive interface 102 in the form of a detected pattern of interaction can extend beyond the boundaries of the display, and can serve to assist in the location of the buttons, which are separate from the display.

Generally, the touch sensitive interface 102 includes a touch or proximity sensor array, which can employ various types of touch or proximity sensing technologies including capacitive arrays as well as resistive arrays. The touch sensitive arrays can even employ force sensing element arrays, for detecting an amount of force being applied at the selected location. In this way, a force threshold determination can be taken into account in determining an intended interaction including the selection of an interactive element, such as a virtual key, or the making of a gesture.

Figure 2:
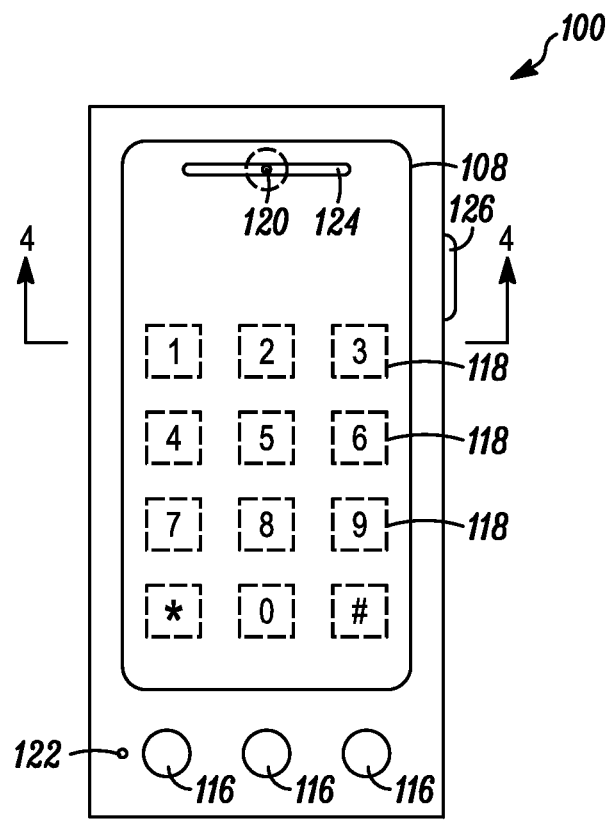
FIG. 2 is a plan view of the exemplary electronic device illustrated in FIG. 1, while being operated in portrait mode.

FIG. 2 illustrates a plan view of the exemplary electronic device 100 illustrated in FIG. 1, while being operated in portrait mode. In the present instance, a plurality of interactive elements in the form of virtual buttons or keys 118 are presented to the user via the display. The virtual buttons 118 are arranged as a numerical keypad, which is similar to the type one might use to enter a telephone number for making a call. Other arrangements or layouts of virtual keys are also envisioned, including those with as few as one key and those with more keys than illustrated. In addition to the virtual buttons 118, interactive elements in the form of porting for a speaker 120 and porting for a microphone 122 are additionally illustrated. The speaker 120 and the microphone 122, and associated porting are physical elements, which have a location on or relative to the interactive surface of the touch sensitive interface. The speaker port is illustrated with a leak tolerant surface slot 124, which helps to maintain a desired acoustic impedance independent of the extent to which a user's ear forms a seal covering the port.

In the illustrated embodiment, the speaker 120 is located within the boundaries of the touch sensitive display 108, where the actual extent of the display may or may not extend into the area in which the speaker 120 is located. The microphone 120 is shown outside the boundaries of the touch sensitive display 108, but as noted above, it is possible that the touch sensitive surface extends beyond the boundaries of the display area, and may encompass surface areas more proximate the microphone. The electronic device 100 additionally includes a physical side button 126, which could be used to detect a user actuation. The side button 126 could be used in conjunction with the other forms of interactive elements, such as the virtual buttons 118, to identify a desire to select a certain function or initiate a selection or an actuation associated with a particular virtual button. For example, the particular virtual button corresponds to the button which coincides with the location of the end of the pointer, such as the tip of the user's finger. Also, the side portion of the device may also include a touch sensitive surface, either isolated from or contiguous with, the touch sensitive surface 102. For example, the side button 126 may be bounded on at least some sides by a touch sensitive surface.

Figure 3:
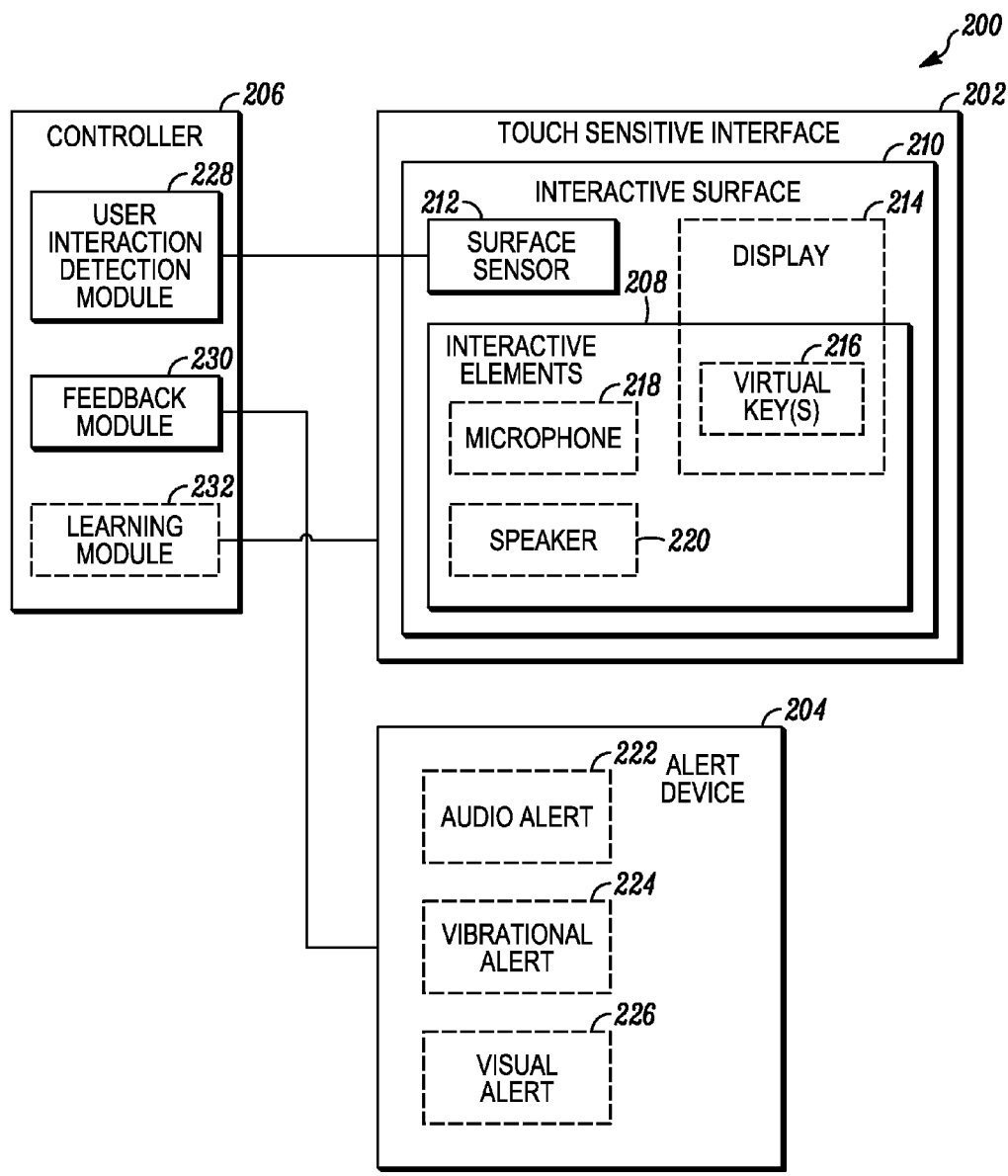
FIG. 3 is a block diagram of a user interface incorporated as part of an electronic device.

FIG. 3 illustrates a block diagram 200 of a user interface incorporated as part of an electronic device. The user interface includes a touch sensitive interface 202, an alert device 204, and a controller 206. The touch sensitive interface 202 includes one or more interactive elements 208 having a position along an interactive surface 210, and a surface sensor 212. The surface sensor 212 is adapted for receiving from a user, for example, 110 in FIG. 1, a pattern of interaction with the touch sensitive interface 202 at a location along the interactive surface 210.

As noted previously, in FIG. 2, the touch sensitive interface 202 could be incorporated as part of a touch sensitive display, which would generally include some form of a display 214. Such an association would enable the surface sensor 212 of the interactive surface to detect or receive a pattern of interaction from a user relative to an interactive elements, e.g., one or more virtual buttons or keys 216, which might be presented to the user via the display. However, it is not necessary for the touch sensitive interface to be associated with a display, as not all interactive elements need to be presented via a display. Alternatively, non-display interactive elements, such as a microphone 218 and/or a speaker 220 could be used in conjunction with the user interface and corresponding method, and still enjoy the benefits of the teachings of the present disclosure. More specifically, a microphone 218 and a speaker 220 are generally physical elements for which it may be beneficial for a user to accurately locate via an interaction with the touch sensitive interface. Generally, when one positions a speaker proximate one's ear, the speaker is not in the field of vision of the user. Consequently, the use of prompts, some of which may be non-visual in nature to help locate a pattern of interaction relative to the position of the speaker, even in absence of a display would still be beneficial.

The alert device 204 is adapted to produce a user perceivable alert signal having a level of alert that is a function of a distance between the location of the pattern of interaction and the position of a closest one of the one or more interactive elements. In one embodiment, as the distance between the location of the pattern of interaction and the position of the closest one of the one or more interactive elements changes, a characteristic of the alert changes. In one or more exemplary embodiments, the alert device 204 can produce one or more of several different forms of alert including an audio alert 222, a vibrational alert 224, as well as a visual alert 226. In some cases the same type of device can produce multiple types of alert. For example, a transducer can be used to produce an audio alert 222, as well as a vibrational alert 224. Still further, to the extent that the device includes a speaker 220, the speaker 220 could be used as an alert device in order to produce at least an audio alert.

While generally, a non-visual alert will be preferred, as the method of locating is intended to assist in the location of an interactive element in instances where direct visual access to the pattern of interaction is obstructed or otherwise nonexistent, in some instances a visual alert might be able to produce a background light that can be perceived by the user, which might suitably serve as proper feedback in assisting the user in locating the one or more interactive elements.

Furthermore, it may be possible to provide a spatially distinct alert, where the sensed alert is believed to have a localized feel. In at least some instances, such a localized effect can be produced and observed through the use of multiple alert sources. For example multiple vibrational devices can have their amplitudes non-uniformly varied such that the perceived source of the vibrational alert may be more proximate the source emitting the alert at the greater alert level. In at least some instances multiple vibrational devices may be placed below the interactive surface proximate the periphery of the surface at each of a set of four corners.

The use of a spatially differentiable alert, as part of adjusting the characteristic of the alert, can be used to help guide the pattern of interaction of the user toward the desired interactive element.

While at least one alert having an alert level which changes as a function of the distance between the location of the pattern of interaction and the position of a closest one of the one or more interactive elements is provided, a second alert can be used to help indicate the identity of the interactive element, when the interactive element is located. Such an alert could be as simple as a verbal prompt speaking the name of the particular interactive element. In the case of a virtual button or key corresponding to a particular number, the corresponding identification alert may pulse a number of times corresponding to the value of the number, for example, when the pattern of interaction of the user with respect to an interactive element corresponding to the number two, "2", coincides with the location of that interactive element. In this example, the alert used for locating the "2" key may be suspended and a second identifying alert may pulse twice when the pointer is positioned over the key.

The controller 206 includes a user interaction detection module 228, a feedback module 230, and in some instances, but not all embodiments, a learning module 232. The user interaction detection module is adapted to detect a location of the pattern of interaction and comparing the detected location to the position of the one or more interactive elements 208. The feedback module 230 is adapted to actuate the alert device for producing a user perceivable alert signal, where the alert signal has a characteristic that is a function of the distance between the location of the pattern of interaction and the position of a closest one of the one or more interactive elements. As the distance between the location of the pattern of interaction and the position of the closest one of the one or more interactive elements changes, the characteristic of the alert changes. For example, the characteristic could be a frequency or amplitude of a tactile or audible alert. More generally, the characteristic could be some other change in the alert that is perceivable to the user.

The learning module 232 is adapted to detect the pattern of interaction including the location thereof which the touch sensitive interface 202 received from the user 110, when the user 110 indicates that the location of the pattern of interaction coincides with or is in a desired position relative to, a position of a corresponding one of the one or more interactive elements. The controller then can use this information in the future to determine whether a current pattern of interaction coincides with or is in a desired position relative to the one or more of the interactive elements. The controller produces an appropriate feedback, which can be adjusted as the distance changes to direct the current pattern of interaction to the desired position. In at least some instances, the user can indicate that the location of the pattern of interaction coincides with, or is in a desired position relative to, the position of the corresponding one of the one or more interactive elements during a learning mode by actuating a user actuatable key or button, such as the side button 126, illustrated in FIG. 2.

In some embodiments, the controller 206 could be implemented in the form of a microprocessor, which is adapted to execute one or more sets of pre-stored instructions, which may be used to form or implement the functionality of at least part of one or more controller modules 228, 230 and/or 232. The one or more sets of pre-stored instructions may be stored in a storage element, not shown, which may be integrated as part of the controller or may be coupled to the controller 206.

A storage element could include one or more forms of volatile and/or non-volatile memory, including conventional ROM, EPROM, RAM, or EEPROM. The storage element may still further incorporate one or more forms of auxiliary storage, which is either fixed or removable, such as a hard drive or a floppy drive. One skilled in the art will still further appreciate that still other further forms of memory could be used without departing from the teachings of the present disclosure. In the same or other instances, the controller 206 may additionally or alternatively incorporate state machines and/or logic circuitry, which can be used to implement at least partially, some of the modules and their corresponding functionality.

Figure 4:
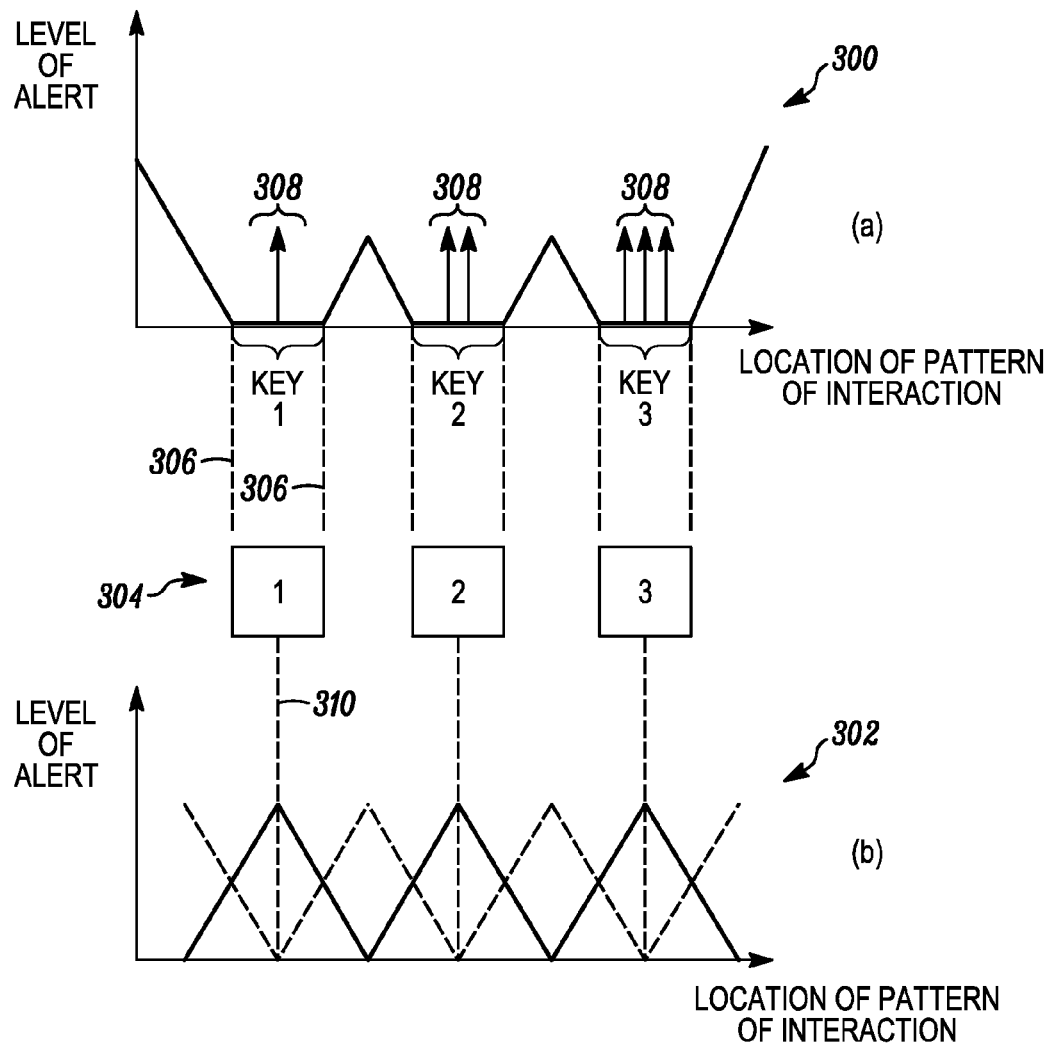
FIG. 4 is a pair of graphs illustrating a level of the alert as a function of the location of the pattern of interaction relative to the position of a row of virtual keys.

FIG. 4 illustrates a pair of graphs 300 and 302 plotting a level of the alert as a function of the location of the pattern of interaction relative to the position of a row of interactive elements, such as a row of virtual buttons or keys 304, in accordance with at least a pair of embodiments of the present invention. In other embodiments, the alert level may be some other characteristic, e.g., frequency, of the user perceptible feedback. The upper graph 300 illustrates a level of alert as a function of the distance between the location of the pattern of interaction and the position of a closest one of a row 304 of interactive elements. In the top graph 300, the distance is measured from the edge 306 of the interactive element. Still further, the alert levels are determined in such a manner that the level increases the further you are away from the interactive element. In this way, the user needs to move in a direction which continues to decrease the level of the alert, at which time when the alert fades to its minimum level, the location of the user and the corresponding pattern of interaction will coincide with the position of the closest key. The top graph further illustrates a secondary identification alert 308, which indicates the identity of the key when the location of the pattern coincides with the location of the interactive element. In the exemplary embodiment, a number of pulses corresponding to the number associated with the interactive element is made. However one skilled in the art will appreciate that an alternative form of identification alert is possible without departing from the teachings of the present invention. For example, as previously noted, a voiced audio signal could speak the name of the number or other functionality associated with the interactive element of key. By associating lower levels of alert with increasing proximity of the pattern of interaction coinciding to the interactive element, the alert level associated with locating the interactive element may minimally interfere with the identification alert signal.

In FIG. 4, the lower graph 302 illustrates a solid line corresponding to a level of an alert signal, which increases as the pattern of interaction approaches the position of the interactive element (a dashed line alternatively shows a decreasing alert signal). Furthermore, the determined distance is measured from the center 310 of the area associated with the interactive element, as opposed to the edge of the area. Any of the various approaches should be suitable, so long as the feedback is consistent, and the user is aware of which one of increasing or decreasing of the level of the alert signal is being used. In some implementations, the user may select whether the alert level increases or decreases with increasing proximity to the corresponding interactive element. This selection may be made for example, from a user configuration menu.

Figure 5:
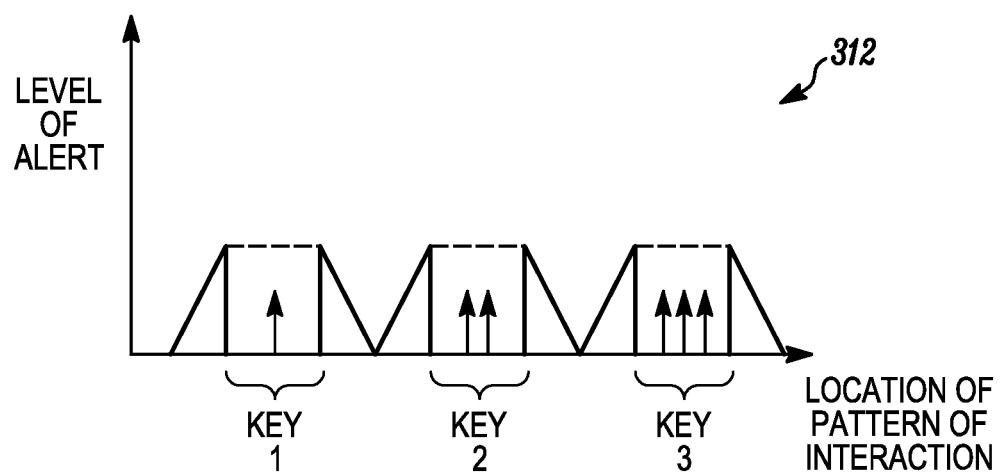
FIG. 5 is a set of alternative alert levels as a function of the location of the pattern of interaction relative to the location of a row of virtual keys, illustrated in FIG. 4.

FIG. 5 illustrates a graph 312 of a still further set of alternative changing alert levels as a function of the location of the pattern of interaction relative to the location of a row of virtual keys, illustrated in FIG. 4. In other embodiments, the alert level may be some other characteristic of the user perceptible feedback. In this example, the level of the signal level increases as the user approaches a corresponding one of the interactive elements, where the distance is measured from the edge of the corresponding area of the interactive element. However, when the location of the pattern of interaction of the user coincides with the position, e.g., traverses a boundary defining the key, of the interactive element, the signal is suspended, discontinued, or the signal level is reduced to a minimum. Reducing the signal level to a minimal signal level allows a secondary identification signal to be used with less interference from any signal associated with locating the interactive element. Alternatively, in FIG. 5, a dashed line illustrates maintaining a higher signal level as opposed to reducing the signal level when the location of the pattern of interaction of the user coincides with the location of the interactive element.

In some instances, interference between the alert signal used to locate the interactive element, and the alert signal used to indicate the identity of the interactive element may be avoided by using one type of alert for the locating alert and a different type of alert for indicating the identity of the located interactive element. For example, one might use a tactile or vibrational alert to assist the user in locating the interactive element, and an audible alert for indicating, when the interactive element is located, an identity of the interactive element, which would not interfere as significantly with a vibrational alert.

While the exemplary interactive elements, used in the example, have a shape corresponding to a square, one skilled in the art will appreciate that other shapes are possible without departing from the teachings of the present invention.

Furthermore, while the increasing and decreasing of the level of alerts in the illustrated embodiments are generally shown in a straight and/or linear line, one skilled in the art will appreciate that the particular function used to determine the change in the level of the alert need not be linear. For example, a rate of change in the characteristic may change more or less with increased proximity to the interactive element.

Figure 6:
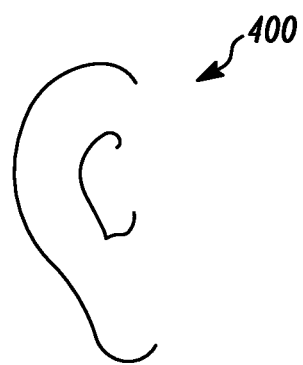
FIG. 6 is a profile of an ear of a user, corresponding to at least partially a potential pattern of interaction, with the surface sensor of touch sensitive interface.
Figure 7:
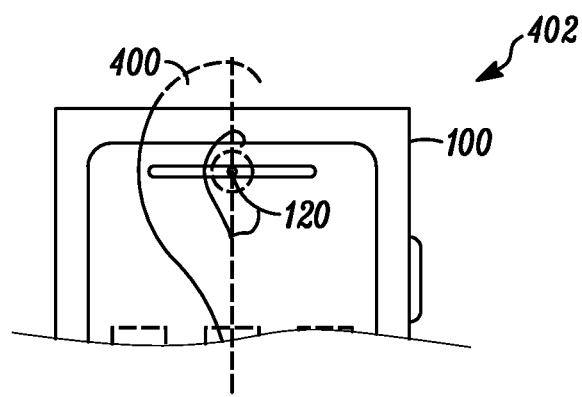
FIG. 7 is a top portion of a front plan view of the exemplary electronic device, illustrated in FIG. 2, with the pattern of interaction associated with the ear of the user located proximate a speaker, in accordance with at least one use position.

FIG. 6 illustrates a profile of an ear 400 of a user, corresponding to at least partially a potential pattern of interaction, with the surface sensor of touch sensitive interface. FIG. 7 illustrates a top portion 402 of a front plan view of the exemplary electronic device 100, illustrated in FIG. 2, with the pattern of interaction associated with the ear 400 of the user 110 located relative to a speaker 120, in accordance with at least one use position. As noted previously, an optimal position of the pattern of interaction could be determined as part of a learning function performed by the user in conjunction with the learning module 232 of the controller 206 described above in connection with FIG. 3. In the learning mode, for example, the user could position the touch sensitive interface adjacent the user's ear until an optimal position relative to the speaker port is determined, at which time a pattern of interaction corresponding to a shape of at least a portion of the user's ear and an optimal position of the pattern of interaction relative to the speaker port is saved for later use. Thereafter, in use, changes in an audible or tactile feedback may be provided to help the user accurately position the device so that the ear is optimally positioned relative to the audio port. In this embodiment, the user receives feedback as the user's ear is moved about the surface of the touch sensitive surface, wherein a characteristic of the feedback changes in a way that helps position the user's ear in the optimal position saved during the learning mode. Furthermore, it is possible that a line of symmetry 404 can be determined and maintained as part of the pattern of interaction, which would enable the same pattern to be used if the user decides to switch ears against which the device is positioned. A pattern corresponding to either the flipped or unflipped version could be detected, when determining the location of the pattern of interaction, as well as the appropriate level of feedback. In this way, the same user interface could be used to locate other types of interactive elements in addition to virtual keys being presented to the user via a display.

Figure 8:
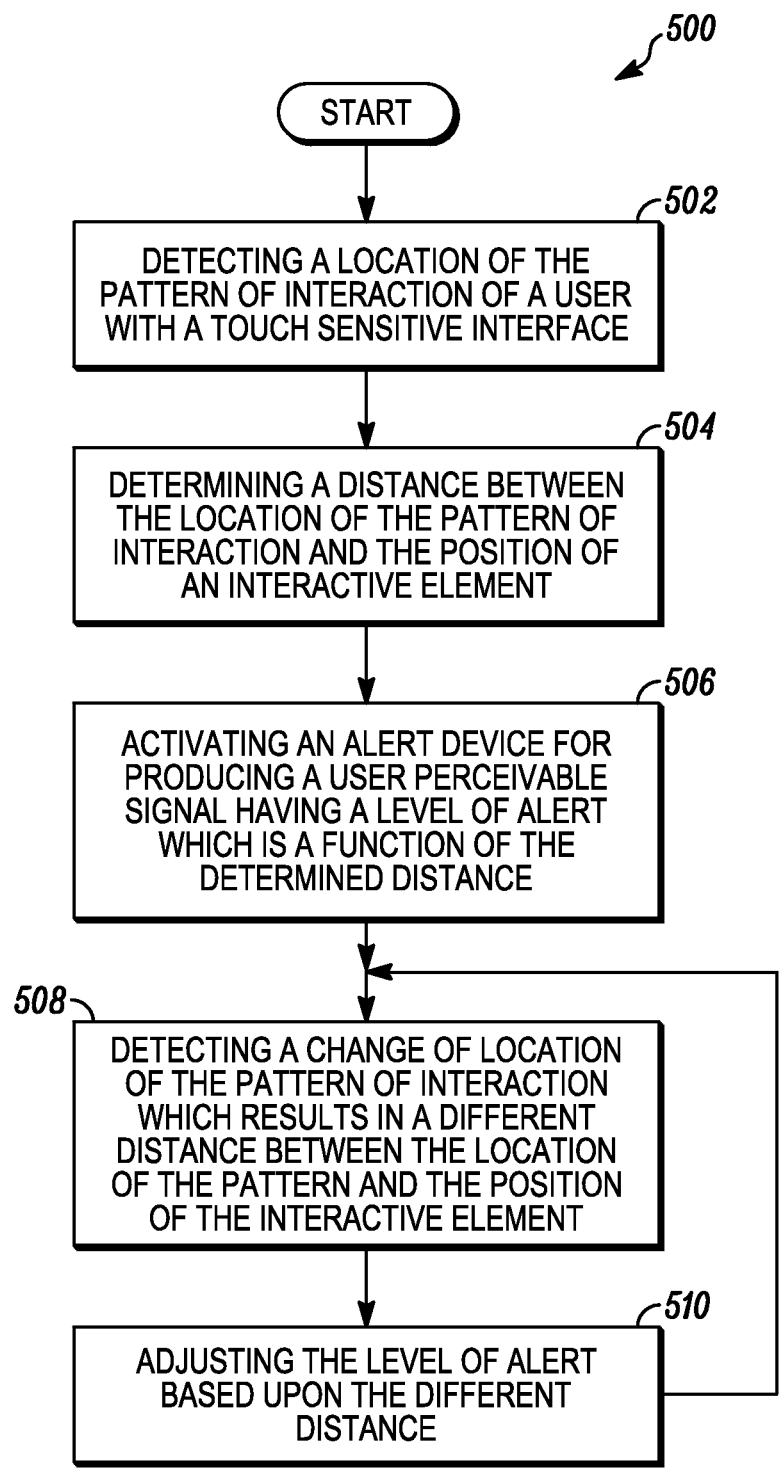
FIG. 8 is a flow diagram of a method of locating an interactive element along an interactive surface of a touch sensitive interface of an electronic device.

Similar to locating a pattern of interaction associated with the user's ear relative to a speaker, the user interface of the present invention could be used to locate other body parts or objects relative to different items associated with the electronic device. For example, the user interface could be used to locate the cheek/chin of the user relative to the microphone at a user identified preferred position, which could similarly be identified through the use of the learning module of the controller FIG. 8 illustrates a flow diagram of a method 500 of locating an interactive element disposed on or along an interactive surface of a touch sensitive interface. The method includes, at 502, detecting a location of a pattern of interaction of a user with the touch sensitive interface. At 504, a distance between the location of the pattern of interaction and the position of the interactive element is then determined. At 506, an alert device is then actuated to produce a user perceivable signal having a characteristic that is a function of the determined distance between the location of the pattern of interaction and the position of the interactive element. At 508, a change of location of the pattern of interaction of the user with the touch sensitive interface is then detected, wherein the change results in a different distance between the location of the pattern of interaction and the position of the interactive element. At 510, the characteristic of alert of the user perceivable signal is adjusted based upon the change in distance between the location of the pattern of interaction and the position of the interactive element.

As noted previously, in some instances, when the location of the pattern of interaction of the user with the touch sensitive interface coincides with the position of the interactive element, the production of the user perceivable signal is then discontinued, and a second user perceivable alert signal, which indicates the identity of the located interactive element is produced.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A user interface for an electronic device comprising:
a touch sensitive interface including one or more interactive elements having a position along an interactive surface, wherein the one or more interactive elements includes a speaker, and a surface sensor, the surface sensor being adapted for receiving from a user a pattern of interaction with the touch sensitive interface at a location along the interactive surface, wherein the pattern of interaction includes a shape of at least a portion of an ear of the user placed adjacent to the touch sensitive interface;
an alert device; and
a controller including
a user interaction detection module adapted for detecting the location of the pattern of interaction and comparing the location to the position of the one or more interactive elements; and
a feedback module adapted for actuating the alert device for producing a user perceivable alert signal having a level of alert which is a function of the distance between the location of the pattern of interaction and a previously determined desired reference position relative to the one or more interactive elements, wherein as the distance between the location of the pattern of interaction and the previously determined desired reference position changes, the level of the alert changes.

2. A user interface for an electronic device in accordance with claim 1, wherein the touch sensitive interface is a touch sensitive display.

3. A user interface for an electronic device in accordance with claim 2, wherein the one or more interactive elements include an image of a virtual key visually represented along the interactive surface via the touch sensitive display.

4. A user interface for an electronic device in accordance with claim 3, wherein the pattern of interaction includes at least one of a portion of a finger of the user or a tip of a stylus.

5. A user interface for an electronic device in accordance with claim 1, wherein the controller additionally includes a learning module, which is adapted for detecting the pattern of interaction with the touch sensitive interface received from the user, when the user indicates that the location of the pattern of interaction coincides with the position of a corresponding one of the one or more interactive elements.

6. A user interface for an electronic device in accordance with claim 1, wherein the alert device produces an audible alert.

7. A user interface for an electronic device in accordance with claim 1, wherein the alert device produces a vibrational alert.

8. A user interface for an electronic device in accordance with claim 1, wherein the level of the alert increases as the distance between the location of the pattern of interaction and the position of the closest one of the one or more interactive elements increases.

9. A user interface for an electronic device in accordance with claim 1, wherein the level of the alert decreases as the distance between the location of the pattern of interaction and the position of the closest one of the one or more interactive elements increases.

10. A user interface for an electronic device in accordance with claim 1, wherein a second user perceivable alert signal, is actuated when the location of the pattern of interaction coincides with the position of the closest one of the one or more interactive elements.

11. A user interface for an electronic device in accordance with claim 10, wherein the second user perceivable alert signal is produced by the alert device.

12. A user interface for an electronic device in accordance with claim 10, wherein the second user perceivable alert signal is produced by a second alert device.

13. A user interface for an electronic device in accordance with claim 10, wherein the second user perceivable alert signal is an audible alert.

14. A user interface for an electronic device in accordance with claim 1, further comprising a user actuatable element, which when activated is adapted to select a particular one of the one or more interactive elements with which the detected location of the pattern of interaction coincides.

15. A method in accordance with claim 1, whereby the perceivable alert signal from the feedback module is adapted to assist the user to navigate the at least portion of the user's ear toward the previously determined desired reference position relative to the speaker.

16. A user interface for an electronic device comprising:
a touch sensitive interface including one or more interactive elements having a position along an interactive surface, wherein the one or more interactive elements includes a microphone, and a surface sensor, the surface sensor being adapted for receiving from a user a pattern of interaction with the touch sensitive interface at a location along the interactive surface, wherein the pattern of interaction includes a shape of at least a portion of a face of the user placed adjacent to the touch sensitive interface;
an alert device; and
a controller including
 a user interaction detection module adapted for detecting the location of the pattern of interaction and comparing the location to the position of the one or more interactive elements; and
 a feedback module adapted for actuating the alert device for producing a user perceivable alert signal having a level of alert which is a function of the distance between the location of the pattern of interaction and a previously determined desired reference position relative to the one or more interactive elements, wherein as the distance between the location of the pattern of interaction and the previously determined desired reference position changes, the level of the alert changes.

17. A method in accordance with claim 16, whereby the perceivable alert signal from the feedback module is adapted to assist the user to navigate the at least portion of the user's face toward the previously determined desired reference position relative to the microphone.

18. A method of locating an interactive element positioned on an interactive surface of a touch sensitive interface, the method comprising:
 detecting a location of a nonpoint user interaction with the touch sensitive interface relative to the position of the interactive element;
 providing a user perceivable signal having a characteristic that is a function of a distance between the location of the nonpoint user interaction with the touch sensitive interface and the position of the interactive element;
 detecting a change in the location of the nonpoint user interaction with the touch sensitive interface relative to the position of the interactive element; and
 changing the characteristic of the user perceivable signal based upon the change in distance between the location of the nonpoint user interaction with the touch sensitive interface and the position of the interactive element.

19. A method in accordance with claim 18 further comprising discontinuing the production of the user perceivable signal and producing a second user perceivable signal when the location of the nonpoint user interaction with the touch sensitive interface coincides with the position of the interactive element.

* * * * *